US006363080B1

(12) United States Patent
Katko

(10) Patent No.: US 6,363,080 B1
(45) Date of Patent: *Mar. 26, 2002

(54) METHOD AND APPARATUS FOR BYPASSING A LOCAL EXCHANGE CARRIER USING ANALOG IN-BAND SIGNALING

(75) Inventor: Mark G. Katko, Toledo, OH (US)

(73) Assignee: LightSource Telecom LLC, Cleveland, OH (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/806,471

(22) Filed: Feb. 26, 1997

(51) Int. Cl.[7] .................................................. H04J 3/16
(52) U.S. Cl. ........................ 370/466; 379/201; 370/522
(58) Field of Search .................................. 370/384, 360, 370/357, 522, 523, 524, 420, 466, 537, 539, 540, 527, 359, 220; 379/93.01, 201

(56) References Cited

U.S. PATENT DOCUMENTS

| | | | |
|---|---|---|---|
| 4,685,101 A | * 8/1987 | Segal et al. | 370/539 |
| 4,731,823 A | 3/1988 | Warner et al. | 379/220 |
| 4,793,663 A | 12/1988 | Rockne et al. | 379/113 |
| 4,802,199 A | 1/1989 | Lange et al. | 379/221 |
| 4,897,870 A | 1/1990 | Golden | 379/144 |
| 4,924,500 A | 5/1990 | Lewis et al. | 379/201 |
| 4,982,421 A | 1/1991 | Kirsch et al. | 379/216 |
| 5,001,711 A | * 3/1991 | Obana et al. | 370/539 |
| 5,023,904 A | 6/1991 | Kaplan et al. | 379/91 |
| 5,130,982 A | 7/1992 | Ash et al. | 370/85.7 |
| 5,138,657 A | 8/1992 | Colton et al. | 379/220 |
| 5,181,238 A | 1/1993 | Medamana et al. | 379/95 |
| 5,193,087 A | 3/1993 | Lichtash et al. | 370/58.2 |

(List continued on next page.)

OTHER PUBLICATIONS

Abstract entitled "3630 MainStreet", 1993.

Primary Examiner—Chau Nguyen
Assistant Examiner—Phuongchau Ba Nguyen
(74) Attorney, Agent, or Firm—Woodcock Washburn LLP

(57) ABSTRACT

A technique for reducing or eliminating the access charges typically payable by an IXC to a LEC, and, in turn, payable by the subscriber to the IXC, for originating long distance calls by providing a hardwire connection between the IXC and the customer premises. The hardwire connection is created by purchasing analog facilities from the LEC which originate at the Central Office and connecting these facilities directly to a Central Office D4 multiplexer. The terminating end of the analog facilities are installed at the subscriber premises and terminated on a standard RJ11X four wire jack. The voice interface modules typically used in the D4 multiplexer are replaced by Foreign Exchange Subscriber (FXS) modules which perform A/D conversion of the analog voice data provided over the analog facilities from the customer premises. A T1 or higher capacity digital facility is also ordered from the LEC to terminate to the Central Office D4 multiplexer, and the T1 or higher capacity digital facility is D4/AMI configured for 56 kbps DS0 channels. The terminating end of the T1 or higher capacity digital facility is directed to a tandem "toll" Central Office and is terminated on a K01 digital electronic cross-connect system (DEXCS) frame which is ordered from the LEC. Each of the channels of the T1 or higher capacity digital facility is then configured by the customer using a network reconfiguration service at the end pointing towards the Central Office D4 multiplexer with Foreign Exchange Office (FXO) Loop Start signaling. A T1 is also ordered from the LEC to connect the DEXCS to the IXC and is also D4/AMI configured for 56 kbps DS0 channels. Each of the channels of this T1 is also configured by the customer using the reconfiguration service at the end pointing towards the IXC with FXS Loop Start signaling. The IXC terminates the T1 from the DEXCS within its own Call Control Platform.

30 Claims, 4 Drawing Sheets

U.S. PATENT DOCUMENTS

| | | | |
|---|---|---|---|
| 5,214,692 A | 5/1993 | Chack et al. | 379/265 |
| 5,276,444 A | 1/1994 | McNair | 340/825.33 |
| 5,293,376 A | 3/1994 | White | 370/54 |
| 5,406,583 A | 4/1995 | Dageviren | 375/5 |
| 5,425,085 A | 6/1995 | Weinberger et al. | 379/112 |
| 5,430,717 A | 7/1995 | Fowler et al. | 370/58.2 |
| 5,459,779 A | 10/1995 | Backaus et al. | 379/201 |
| 5,463,686 A | 10/1995 | Lebourges | 379/220 |
| 5,465,294 A | 11/1995 | Chapman, Jr. et al. | 379/207 |
| 5,475,749 A | 12/1995 | Akinpelu et al. | 379/221 |
| 5,481,604 A | 1/1996 | Minot | 379/221 |
| 5,510,777 A | 4/1996 | Pile et al. | 340/825.31 |
| 5,517,562 A | 5/1996 | McConnell | 379/207 |
| 5,524,142 A | 6/1996 | Lewis et al. | 379/112 |
| 5,526,413 A | 6/1996 | Cheston, III et al. | 379/201 |
| 5,533,111 A | 7/1996 | Schlanger | 379/201 |
| 5,537,461 A | 7/1996 | Bridges et al. | 379/88 |
| 5,537,464 A | 7/1996 | Lewis et al. | 379/114 |
| 5,537,468 A | 7/1996 | Hartmann | 379/221 |
| 5,539,817 A | 7/1996 | Wilkes | 379/230 |
| 5,550,820 A | 8/1996 | Baran | 370/60.1 |
| 5,550,912 A | 8/1996 | Akinpelu et al. | 379/221 |
| 5,557,667 A | 9/1996 | Bruno et al. | 379/201 |
| 5,566,235 A | 10/1996 | Hetz | 379/201 |
| 5,570,410 A | 10/1996 | Hooshiari | 379/32 |
| 5,574,783 A | 11/1996 | Dunn | 379/230 |
| 5,583,926 A | 12/1996 | Venier et al. | 379/207 |
| 5,583,929 A | 12/1996 | Ardon | 379/230 |
| 5,751,717 A * | 5/1998 | Babu et al. | 370/466 |

* cited by examiner

METHOD AND APPARATUS FOR BYPASSING A LOCAL EXCHANGE CARRIER USING ANALOG IN-BAND SIGNALING

BACKGROUND OF THE INVENTION

1. Field of the Invention

The present invention relates generally to a telecommunications system for originating calls using a hardwire connection that bypasses and thus does not require the involvement of a local service provider with respect to vertical and call control features and functions and, in particular, to such a system that uses analog in-band signaling without requiring specialized customer premises equipment.

2. Description of the Prior Art

Prior art systems for originating and receiving telephone calls, particularly long distance telephone calls, typically involve routing through the facilities (e.g., switches) of a local service provider, commonly called a local exchange carrier (LEC). With respect to outgoing calls placed from a subscriber location, the LEC switch serving the subscriber's customer premises equipment senses an off-hook condition and extends dial tone. When the dialed digits are received in the LEC switch, any features associated with the originating subscriber, such as speed dialing, are applied to the call, and the call is then routed to the desired destination. If the call is a long distance call that is routed to a long distance or inter-exchange carrier (IXC), then the IXC will pay originating end and terminating end "access charges" to the LEC for servicing the call, and the subscriber will, in turn, pay the IXC for the call.

Currently, the access charges paid to LECs by the IXCs for the use of carrier common line service vary by LEC but can, depending on a call's duration and cost per minute, constitute upwards of 40% of the overall cost of the call. Accordingly, eliminating the cost of the originating end access charges could save a significant percentage of the cost of a long distance call. Bypassing the LEC and the associated originating end access charges could save the IXCs a significant portion of their service costs for providing long distance calls and, once the associated savings are passed on to the subscribers, potentially save the subscribers billions of dollars each year in long distance charges. Payment of such access charges remains a thorny issue in the competitive environment in the telecommunications industry since the passage of the recent telecommunications legislation and is a primary obstacle to enhanced competition between the LECs and other potential entrants into the local telecommunications marketplace. As a result, any long distance service provider who can bypass the LEC and avoid payment of the originating end access charges will be at a substantial competitive advantage.

The inventor is aware of three prior art techniques by which to complete a long distance call without paying the access charges to the LEC.

The first prior art technique known to the inventor for bypassing the LEC is to provide a separate communications system which provides the subscriber with access to the unregulated long distance telephone carriers through an alternative transmission path besides telephone lines into the subscriber's premises. For example, Baran describes in U.S. Pat. No. 5,550,820 a bi-directional communications system which bypasses the LEC by conveying voice and data over cable television lines from the customer premises to a switching unit that has the functionality of a Class 5 central telephone office switch and is connected to the public switched telephone network. In the system described by Baran, special terminal units are provided at the customer premises, and the signals from the terminal units are converted by a relay transceiver bi-directionally between the signal format of the terminal units and fixed length compliant asynchronous transfer mode ("ATM") cells. These ATM cells are then transmitted via the cable television bandwidth to a cable television hub where the ATM cells are bi-directionally converted by a transmission interface unit into time division multiplexed signals in the upstream direction away from the terminal units for connection to a cellular telephone switch, and from time division multiplexed signals into fixed length compliant ATM cells in the downstream direction towards the terminal units.

While the system described by Baran does indeed bypass the LEC, it still encumbers the subscriber and long distance carrier with many of the same problems as the conventional telephone system. In particular, since the cable television lines are typically owned and operated by a cable television company, access charges are still payable to the cable television company. Also, additional equipment, namely, the terminal units, are required at the customer premises, leading ultimately to additional cost to the subscriber.

The second prior art technique known to the inventor for bypassing the LEC is to create a virtual piped connection over the conventional telephone lines using specialized customer premises equipment at the subscriber location and a specially configured call control platform in the IXC network to originate and receive calls using in-band signaling techniques. Such a technique is described in U.S. Pat. No. 5,533,111, where Schlanger describes a system utilizing a specialized multiplexer to create a virtual piped connection by converting an analog trunk signal into a usable in-band digital carrier. The virtual pipe is established through an initial call made from the specialized customer premises equipment, while in a conventional mode, to the call control platform. Once the virtual pipe is established, the specialized customer premises equipment operates in a bypass mode such that calls made by the subscriber using the specialized customer premises equipment "bypass" the LEC. As long as the virtual pipe exists, the IXC can provide vertical and call control features and functions for incoming and outgoing calls using in-band signaling, while the call control functions typically provided by the customer premises equipment using out-of-band signaling, such as call origination, off-hook, on-hook, and ringing, are provided using in-band signaling. However, conventional out-of-band signaling may still be used to provide conventional LEC features such as call waiting. The virtual pipe to the call control platform may be used for a plurality of calls without being disconnected since the customer premises equipment is prevented from generating a conventional out-of-band mode disconnect signal until breakdown of the virtual pipe is requested by the subscriber. As a result, a subscriber can make one call and pay for one access connection via the LEC and then use that single access connection indefinitely to produce calls across that "virtual" channel.

While the in-band signaling technique described by Schlanger can greatly reduce the amount of access charges paid by the subscriber and long distance carrier, such a technique is disadvantageous in that specialized customer premises equipment is required that must be carried around by the subscriber. Such equipment adds greatly to the cost for the subscriber and is also a very inconvenient way to implement LEC bypass for the subscriber.

The third prior art technique known to the inventor for bypassing the LEC is for the subscriber to lease a T1 line to provide direct switch to switch access to the IXC. However, this approach is prohibitively expensive to all but those companies with very high call volumes sufficient to justify the cost of a T1 line. Leasing a T1 line is quite impractical for companies or individuals with relatively small call volumes where the leasing costs of the T1 line alone would be greater than the amount otherwise paid in originating end access charges.

Accordingly, a LEC bypass technique is desired that does not require specialized customer premises equipment and which is thus more cost competitive. A LEC bypass technique is also desired which extends the benefits of direct T1 access to smaller volume callers without the associated costs of leasing an entire T1 line. The present invention has been designed to meet these great needs in the art.

SUMMARY OF THE INVENTION

The present invention meets the above-mentioned needs in the art by providing a LEC bypass technology which does not require the subscriber to purchase any new costly hardware. Instead, the LEC bypass is accomplished utilizing existing network technology within the LEC's tariffed equipment which effectively permits a plurality of subscribers to share a T1 (DS-1) line for their long distance calling.

In particular, the access charges typically payable by an IXC to a LEC, and, in turn, payable by the subscriber to the IXC, for originating calls are reduced or eliminated by providing a hardwire connection between the IXC and the customer premises. This connection allows a subscriber to "bypass" the LEC switching equipment and thus does not require involvement of the local service provider. The hardwire connection is created by purchasing analog data facilities from the LEC which originate at the Central Office. In a preferred embodiment, these facilities are connected directly to a Central Office D4 multiplexer. The voice interface modules typically used in the D4 multiplexer are then replaced by Foreign Exchange Subscriber (FXS) modules which are typically used to interface a customer's data terminal equipment to T1 or fractional (FT1) services. The terminating end is installed at the subscriber premises and terminated on a standard RJ11X four wire jack. A T1 high capacity digital facility is also ordered from the LEC to terminate to the Central Office D4 multiplexer, and the T1 is D4 /AMI configured for 56 kbps DS0 channels. The terminating end of the T1 is directed to a tandem "toll" Central Office and is terminated on a K01 digital electronic cross-connect system (DEXCS) frame which is ordered from the LEC as a reconfigurable data service with customer access. Each of the channels of the T1 is then configured by the customer using the reconfiguration service at the end pointing towards the Central Office D4 multiplexer with Foreign Exchange Office (FXO) Loop Start signaling. A T1 is also ordered from the LEC to connect the DEXCS to the IXC and is also D4/AMI configured for 56 kbps DS0 channels. Each of the channels of this T1 is also configured by the customer using the reconfiguration service at the end pointing towards the IXC with FXS Loop Start signaling. The IXC terminates the T1 within the IXC network and switches the call and performs all required features associated with the call connection in a conventional manner.

In an alternative embodiment, a T3 (DS-3) or higher high capacity digital line may connect the Central Office D4 multiplexer to the DEXCS frame. In such an embodiment, one or more T3:T1 DACCS systems and one or more T3 multiplexers may be used to interface the T1 lines to the T3 lines. Of course, if higher capacity lines were used, higher capacity multiplexers would be required.

In another alternative embodiment, direct analog connections from the customer premises to the DEXCS frame are utilized. In such an embodiment, the DEXCS will accept analog interface cards which are a tariffed service provided by the LEC. The DEXCS is programmed as FXS signaling at the tandem side of the office and FXO to the T1 carrier side. A cross-connect is established to complete the circuit pathway. However, those skilled in the art will appreciate that the cost of such a connection and long-haul analog data lines may be prohibitively expensive.

The hardwire connection implemented by the technique of the invention permits the IXC to connect the calling and called parties without the utilization of an originating end access charge to the LEC and without requiring the calling party to utilize any additional equipment for accessing the service. Instead, the voice connection is made utilizing LEC services which are currently tariffed and available in the continental United States for data services. By placing certain pieces of LEC network equipment in the correct sequence as described herein, analog voice grade service is readily converted to digital high capacity service without payment of an originating end access charge to the LEC for use of the tariffed voice switching equipment. In short, the analog to digital conversion performed at the D4 multiplexer using the FXS modules or at the DEXCS frame in accordance with the invention allows the subscriber to use standard analog telephone sets to access the IXC's digital network via the lower tariffed data network without having to pass through the LEC's switching hardware tariffed for voice services.

BRIEF DESCRIPTION OF THE DRAWINGS

The objects and advantages of the invention will become more apparent and more readily appreciated from the following detailed description of the presently preferred exemplary embodiments of the invention taken in conjunction with the accompanying drawings of which.

DETAILED DESCRIPTION OF PRESENTLY PREFERRED EMBODIMENTS

A method and apparatus for bypassing a local exchange carrier (LEC) in accordance with the presently preferred exemplary embodiments of the invention will be described below with reference to FIGS. 1–4. It will be appreciated by those of ordinary skill in the art that the description given herein with respect to those figures is for exemplary purposes only and is not intended in any way to limit the scope of the invention. All questions regarding the scope of the invention may be resolved by referring to the appended claims.

Figure 1:
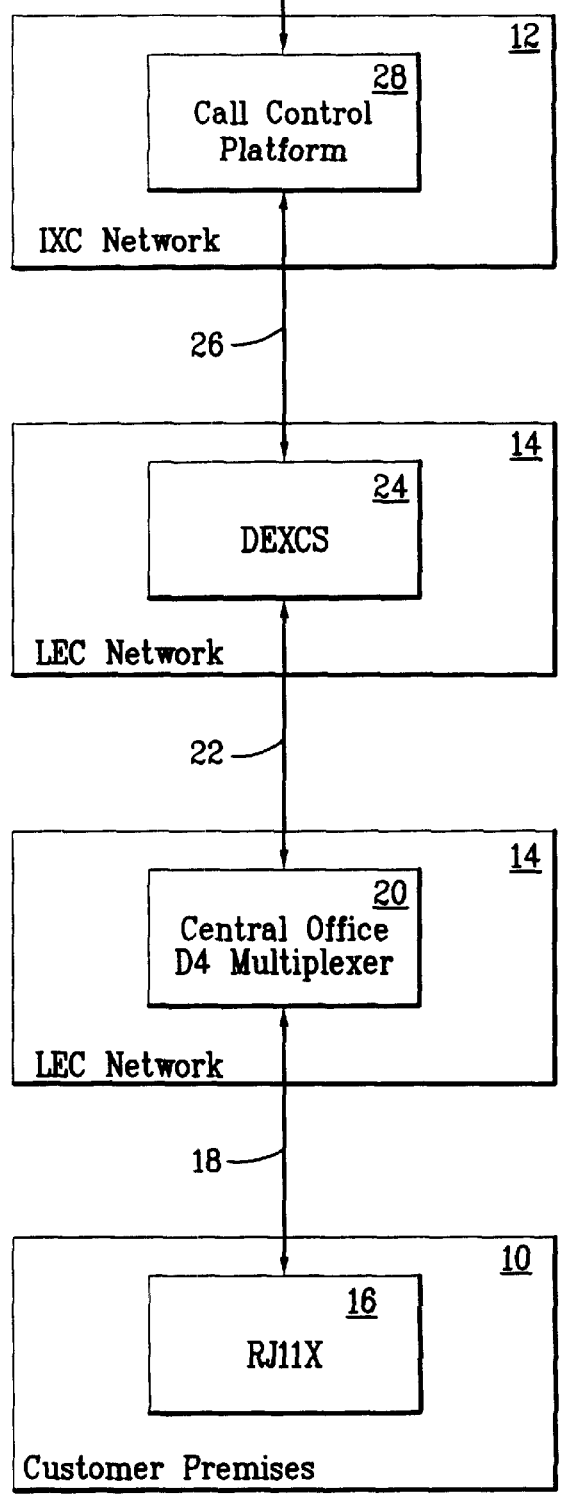
FIG. 1 is an overall block diagram illustrating the hardwire connection between the subscriber premises and the IXC network for bypassing the LEC originating end access charges in accordance with a preferred embodiment of the invention.

The present invention relates to a method and apparatus for bypassing LEC equipment tariffed for voice services to provide a customer with direct access, without access charges, to a long distance inter-exchange carrier (IXC). As shown in FIG. 1, such bypass is accomplished in accordance with a preferred embodiment of the invention by creating a hardwire connection between the customer premises 10 and the IXC network 12 via the LEC network 14 using only LEC equipment tariffed for data transmission. As illustrated, the terminating end of the hardwire connection is installed at the customer premises 10 and terminated on a standard RJ11X four wire jack 16. An analog data line 18 is connected directly to the LEC's Central Office D4 multiplexer 20 instead of the conventional D0 digital data line. As will be explained in more detail below, the voice interface modules typically used in the D4 multiplexer are replaced by Foreign Exchange Subscriber (FXS) modules which are typically used to interface a customer's data terminal equipment to T1 or fractional (FT1) services. In accordance with the invention, the FXS modules instead provide A/D and D/A conversion of the voice data provided over the analog data line 18 and also introduce an analog carrier into the D4 multiplexer 20 which is programmed to provide ground start or E & M signaling at the bit level (A=1; B=0) to provide the routing and voice data to the IXC network 12 using techniques known in the art. A T1 high capacity digital line 22 which is D4/AMI configured for 56 kbps DS0 channels connects the Central Office D4 multiplexer 20 to a tandem "toll" Central Office and is terminated on a K01 digital electronic cross-connect system (DEXCS) frame 24 which provides software switching of digitized voice data at the channel level. The K01 DEXCS frame 24 is preferably ordered from the LEC as a reconfigurable data service with customer access, and each of the channels of the T1 line 22 is then configured by the customer using the reconfiguration service at the end pointing towards the Central Office D4 multiplexer 20 with Foreign Exchange Office (FXO) Loop Start signaling. A T1 line 26 which is D4/AMI configured for 56 kbps DS0 channels connects the DEXCS frame 24 to the IXC network 12, and each of the channels of the T1 line 26 is also configured by the customer using the reconfiguration service at the end pointing towards the IXC with FXS Loop Start signaling. The IXC terminates the T1 line 26 within its own Call Control Platform 28 and switches the call to/from the called party/calling party premises and performs all required features associated with the call connection in a conventional manner.

Unlike the afore-mentioned Schlanger virtual connection which is set up and torn down by the user in order to make long distance calls, the hardwire connection of the invention is permanent and is not torn down. Originating end access charges payable to the LEC are bypassed by using dedicated voice grade quality tariffed D4 data lines where the signaling for the voice channels is carried "in-band" and the analog to digital conversion of the voice channel is performed at the D4 multiplexer using Foreign Exchange Subscriber (FXS) modules. Moreover, by configuring the T1 line 22 for a plurality of DS0 channels, each customer may be assigned a portion of a T1 line and share the costs of that T1 line service with, for example, up to 23 other customers. The necessary hardware may be purchased from the LEC and configured without LEC assistance. Since the T1 data network tariff is significantly less costly than the network tariff for voice services, savings of up to 55% compared to the costs of conventional LEC access charges are possible using the LEC bypass technique of the invention.

Figure 2:
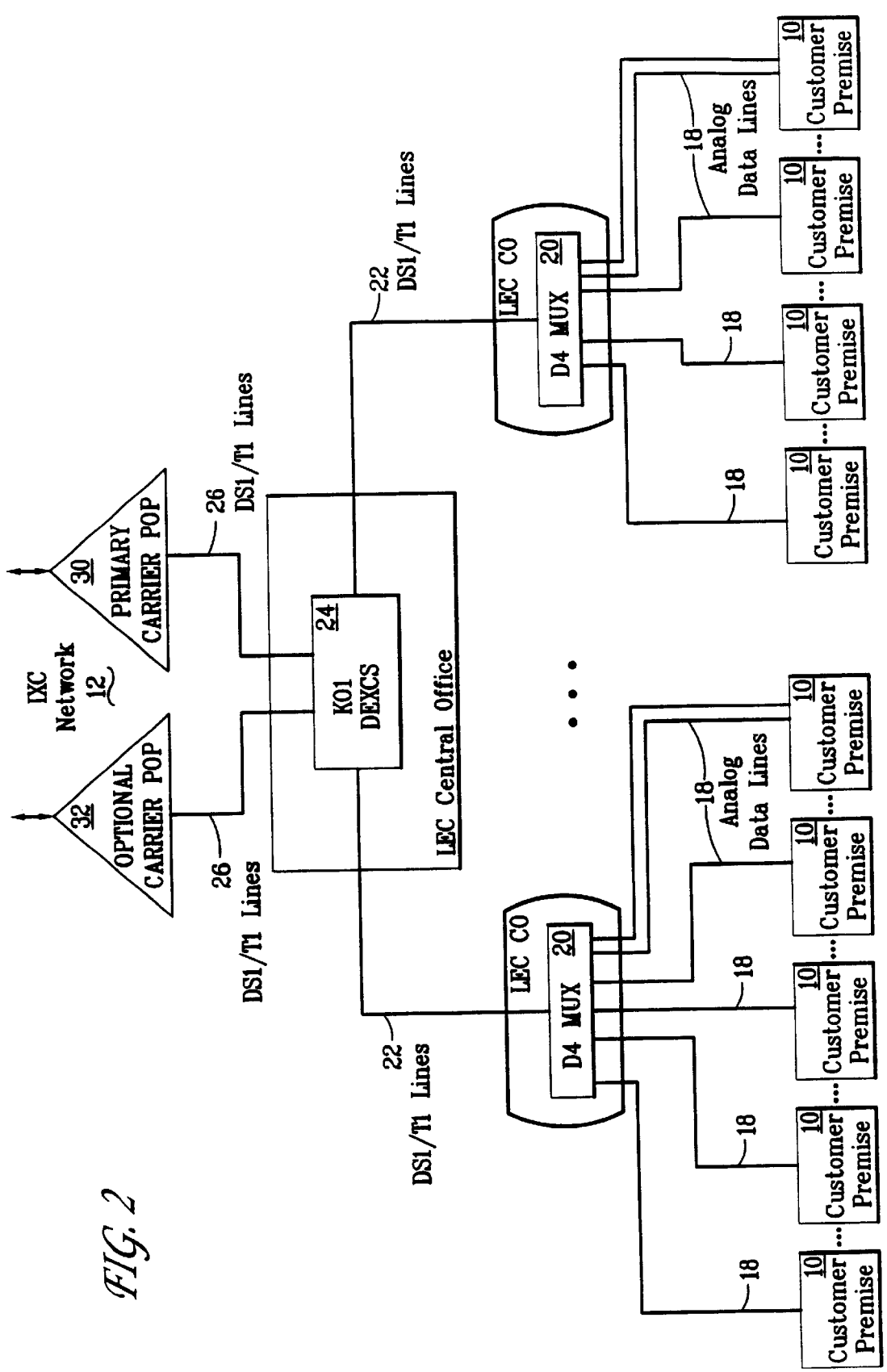
FIG. 2 illustrates in more detail the hardwire connection between the subscriber premises and the IXC network in accordance with a preferred embodiment of the invention.

FIG. 2 illustrates the hardwire connection of FIG. 1 in more detail. As shown, the hardwire connection of the invention is terminated on a standard RJ11X four wire jack 16 at the customer premises 10 and connected via standard 3002 analog data (4-wire leased) lines 18 to a D4 multiplexer 20 at the LEC's central office. As shown, each customer may have one or more analog data lines 18 and, as will be explained below, access to one or more DS0 lines in the T1 line 22. In accordance with the invention, the Network Interface (NX) card typically used at the D4 multiplexer 20 for connecting the subscriber's data terminal to the telephone network is replaced by a Foreign Exchange Service (FXS) module, such as the 2FX0 Module available from Adtran. Typically, the FXS module is used to provide local telephone service from a central office which is foreign to the subscriber's exchange area. However, in accordance with the invention, the FXS module is used to terminate an analog PBX and to channelize (i.e., to multiplex-demultiplex wider bandwidth or higher speed channels into narrower bandwidth or lower speed channels) the central office D4 multiplexer DS0 card assignments by introducing FXS ground start or ear and mouth (E&M) analog signaling at the bit level, where bits are toggled so as to effectively modulate the digital carrier wave from the D4 multiplexer 20 with an analog signal containing the call routing information to thereby provide the analog voice signal via in-band signaling. For example, the E band may carry ANI data while the M band may carry the IXC carrier switching data. Framing of the digitized signal to/from the D4 multiplexer 20 is preferably Superframe Audio Messaging Interchange (AMI) line code. Importantly, the FXS module includes A/D conversion circuitry for digitizing the analog voice signal from the subscriber premises 10 and D/A conversion circuitry for converting to analog the network signal to be sent to the customer premises 10. The D4 multiplexer 20 is typically reconfigured by the customer using the network reconfiguration service conventionally available to customers to allow them to control, rearrange and switch the private line voice and analog data. The customer may dial in the appropriate instructions or call a service number and have a LEC attendant do the reconfiguration. Alternatively, in accordance with the invention it is contemplated that a T1 service provider could lease T1 lines from the LEC and lease slots in those T1 lines to a plurality of customers and handle the reconfiguration as part of the leasing service.

The D4 multiplexer 20 provides the modulated digital data to the digital electronic cross-connect system (DEXCS) 24 via T1 lines 22. The data is preferably transmitted over T1 lines 22 using private line interconnect T1 signaling with optional Superframe AMI or extended Superframe binary 8 zero substitution (B8ZS) channelized into 56 kbps DS0 data channels by the DEXCS equipment 24.

The DECXS equipment 24 (otherwise known as a Digital Access and Crossconnect System (DACS)) is part of a facilities network for assembling small facility inputs such as a 1.5 megabit DS1 signal into large facility outputs such as for fiber optic transmission, and for disassembling large facility inputs into small facility inputs. The DEXCS equipment 24 is typically located at a tandem central office and switches small facility outputs to destination outputs at the T1 (DS1) channel level for use by the switched public common carrier network and for use by private network customers. The DEXCS equipment 24 is responsive to an operation support system (OSS) which provides the basic information needed by the DEXCS equipment 24 to set up the long term connections within each DEXCS system for carrying information of a plurality of trunks. In accordance with the invention, the OSS provides a network reconfiguration service which allows the subscriber to modify his or her system remotely using a dial-up modem and a personal computer. Desired changes in the cross-connect devices that terminate the T1 digital lines 22 and 26 are communicated to the LEC via the customer's personal computer and are performed within minutes or scheduled to occur at any desired future time. Alternatively, the changes are phoned in to a LEC attendant to perform the desired reconfiguration service.

In accordance with the invention, the DEXCS equipment 24 is reconfigured as follows. First, the DEXCS equipment 24 is ordered as a reconfigurable data service with customer access from the LEC. Each of the channels of the T1 (DS1) is then reconfigured at the end pointing towards the Central Office D4 multiplexer 20 with Foreign Exchange Office (FXO) Loop Start Signaling. The port configurations of the DEXCS equipment 24 are also reconfigured to be FXS toward the far end Central Offices and FXO toward the carrier. Bit signaling is E&M or ground start, and framing is preferably either extended Superframe or Superframe carrier signaling using either AMI or B8ZS. The T1 is channelized into DS0s which are assigned by port signaling Superframe AMI A&B (A=1; B=0) bits which are toggled FXO per channel. Ground start or E&M signaling at the bit level may also be provided as desired so that the routing information may be stripped off of the digital signal from the D4 multiplexer 20 and the digitized signal routed to the IXC network 12 in a conventional manner. T1 lines 26 are also ordered from the LEC to connect the DEXCS equipment 24 to the IXC network 12 and are also D4/AMI configured for 56 kbps DS0 channels. Each of the channels of each T1 line 26 is also configured by the customer using the reconfiguration service at the end pointing towards the IXC network 12 with FXS Loop Start signaling. The IXC network 12 terminates the T1 at a primary long distance carrier point of presence (POP) 30 and at an optional long distance carrier point of presence (POP) 32. As known by those skilled in the art, the POPs 30 and 32 are the points at which the LEC terminates subscriber circuits for long-distance dial-up or leased line communications.

Thus, to establish the hardwire connection in accordance with the invention, the subscriber must order the following services from the LEC:
1. DEXCS service;
2. T1 service originating from the DEXCS to the IXC POP;
3. T1 service originating from the DEXCS to the Tandem Central Office;
4. D4 multiplexing service at the Tandem Central Office with 24 cards in each D4 multiplexer (for 24 customers per T1 line); and
5. Analog data lines originating from the Tandem Central Office D4 multiplexer to the customer premises.

These elements make up the hardwire connection in accordance with the invention. Once these services have been provided by the LEC, the reconfiguration steps described above must be performed to activate the DEXCS equipment 24 using the network reconfiguration service. By way of example, the following reconfiguration steps are performed using the Ameritech Reconfiguration Service:
1. Login to the DEXCS system 24 using dial-up software provided by the LEC.
2. Upon login, select "end link listings" from the menu screen.
3. From the end link listings screen, select "circuit to IXC."
4. Select the first channel in the circuit and press "enter."
5. Scroll down the page to the "Com Type" setting.
6. Simultaneously hit the <Ctrl>+<n> keys to list Com Types.
7. Scroll down the list of Com Types to get the FXO settings.
8. Press <Enter> to complete the change to the Com Type.
9. Exit the end link listings.
10. Move to channel two.
11. Repeat steps 4–10 until all 24 channels are set to FXO.
12. From the "end link listings" screen, now select "circuit to Tandem Central Office."
13. Repeat steps 4–6.
14. Scroll down the list of Com Types to get the FXS setting.
15. Repeat steps 8–11 using the FXS setting.
16. Go to the reservation segment listing menu when all Com Types are complete.
17. From the command line type "reserve" and press <Enter>.
18. Move the cursor to "Point 1" and type in the name of the IXC circuit.
19. Move the cursor to "Point 2" and type in the name of the Tandem Central Office circuit.
20. Select "Contiguous Channel", type in "24" and press <Enter>.

The DEXCS equipment 24 is now programmed to bypass the access charge required by the LEC when using conventional voice lines. Those skilled in the art should note that the above 20 step process is required by the Ameritech Reconfiguration Service but that other LECs may offer slightly different interface software for the same purpose.

Once the DEXCS equipment 24 is reconfigured, the hardwire connection between the customer premises 10 and the IXC network 12 is complete and the LEC bypass system of the invention is ready for use. The hardwire connection of the invention compares to the bypass connection described by Schlanger as follows. The bypass connection in the Schlanger system requires AT&T Central Office trunk lines, AT&T switching hardware, AT&T proprietary customer premises equipment, and an AT&T Virtual Central Office Trunk transport. By contrast, the hardwire connection of the invention uses 4-wire lease lines 18 connected to DEXCS equipment 24 for signaling and D4 multiplexers for D/A and A/D conversion via DS1 (T1) lines configured for data transport. Importantly, no specialized customer premises equipment or virtual central office trunk transport is required. Also, since the subscriber's line is not constantly tied up with a virtual connection, no vertical call control functions and the resulting modifications to the call control platform 28 proposed by Schlanger are needed.

During operation, the customer uses his or her telephone equipment to place long distance calls in a conventional manner. No special steps or equipment are necessary. Once the connection is established with the called party, the voice signal is provided by in-band signaling over the T1 line 22 between the DEXCS equipment 24 and the D4 multiplexer 20, which are synchronized to each other. However, at the receiving end, rather than data, voice information is D/A converted and provided to the called party.

In accordance with the invention, each T1 line 22 is preferably shared by up to 24 end user customers at respective customer premises 10. Of course, some customers may use more than one T1 channel as necessary to accommodate their call volume. Accordingly, the cost of the T1 line 22 ordered from the LEC can be distributed among up to 24 customers. Hence, each customer would pay only a fraction of the monthly cost of a tariffed T1 data line 22 instead of paying a large originating access fee per minute of each long distance call. As noted above, this amount is up to 55% less than what the customer would pay in LEC access charges for conventional voice service. The terminating access fee is not affected by the invention and would still be payable to the LEC by the IXC and, in turn, by the customer to the IXC. Of course, the present invention is most cost effective when the customer is a business or an individual who makes many long distance calls.

Figure 3:
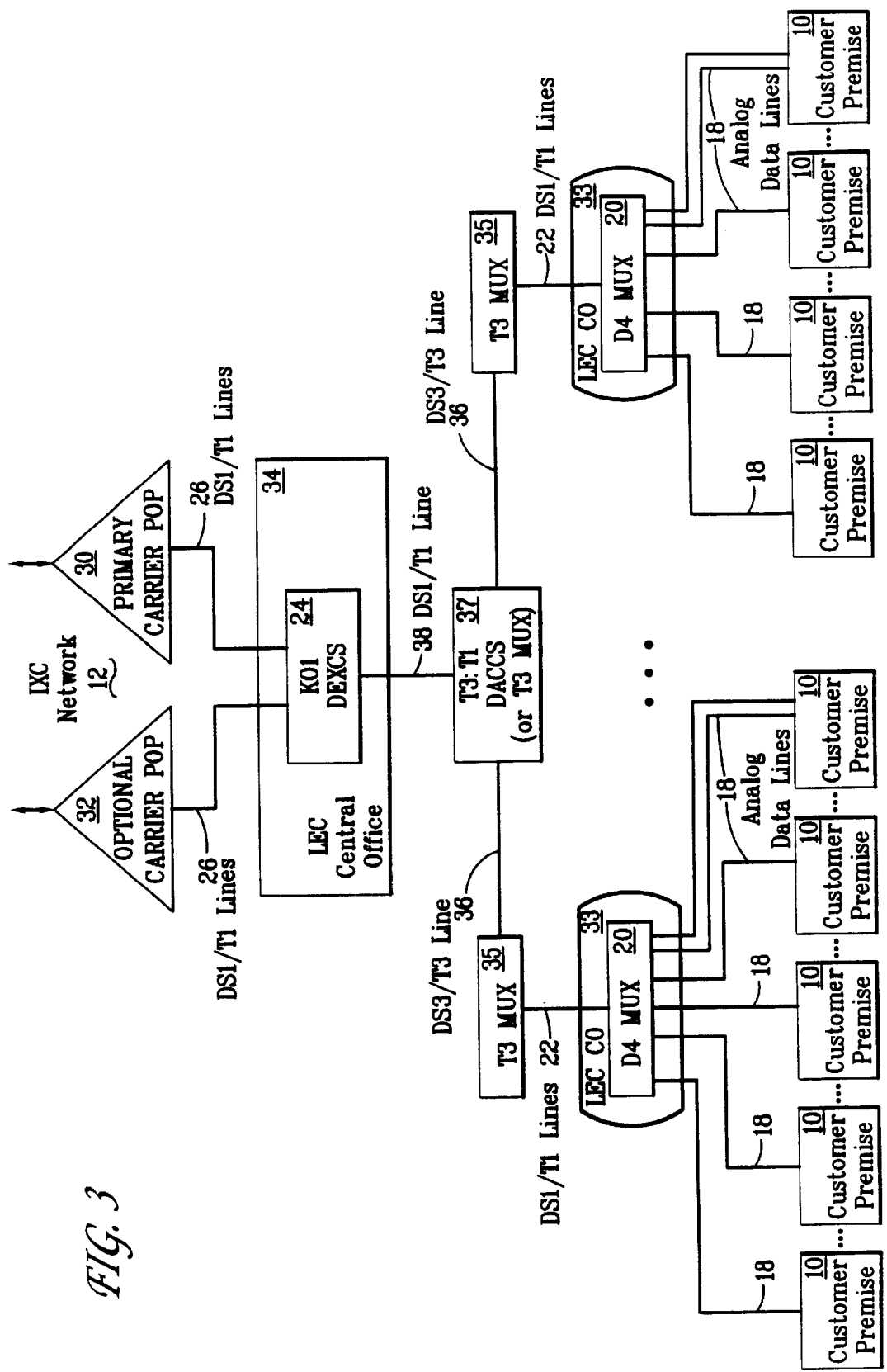
FIG. 3 illustrates the hardwire connection between the subscriber premises and the IXC network in accordance with an alternate embodiment of the invention using T3 lines.

Those skilled in the art will appreciate that any multichannel digital transmission line at DS-1 or above, such as a T3 line (28 T1 lines) or an optical carrier line (preferably OC3 or OC12), may be used to transmit voice data in accordance with the techniques of the invention. By way of example, FIG. 3 illustrates an alternative embodiment of the invention in which a T3 (DS-3) line connects a LEC Central Office 33 with its tandem Central Office 34. In this embodiment, a T3 multiplexer 35 multiplexes/demultiplexes the T1 lines 22 to the T3 lines 36 and vice-versa. At the tandem Central Office side, another T3 multiplexer or a T3:T1 Digital Access and Cross-Connect System (DACCS) 37 may be used to multiplex/demultiplex the T3 lines 36 to the T1 line 38, and vice-versa. As known to those skilled in the art, the DACCS 37 is similar to a DEXCS frame 24 but connects T3 lines to T1 lines. As illustrated, the other end of the T1 line connects to the K01 DEXCS frame 24 just as in the embodiment of FIG. 2. A similar arrangement to FIG. 3 could be used for optical fiber (OC-3 or OC-12) connections. The embodiment of FIG. 3 is otherwise the same as the embodiment of FIG. 2.

Figure 4:
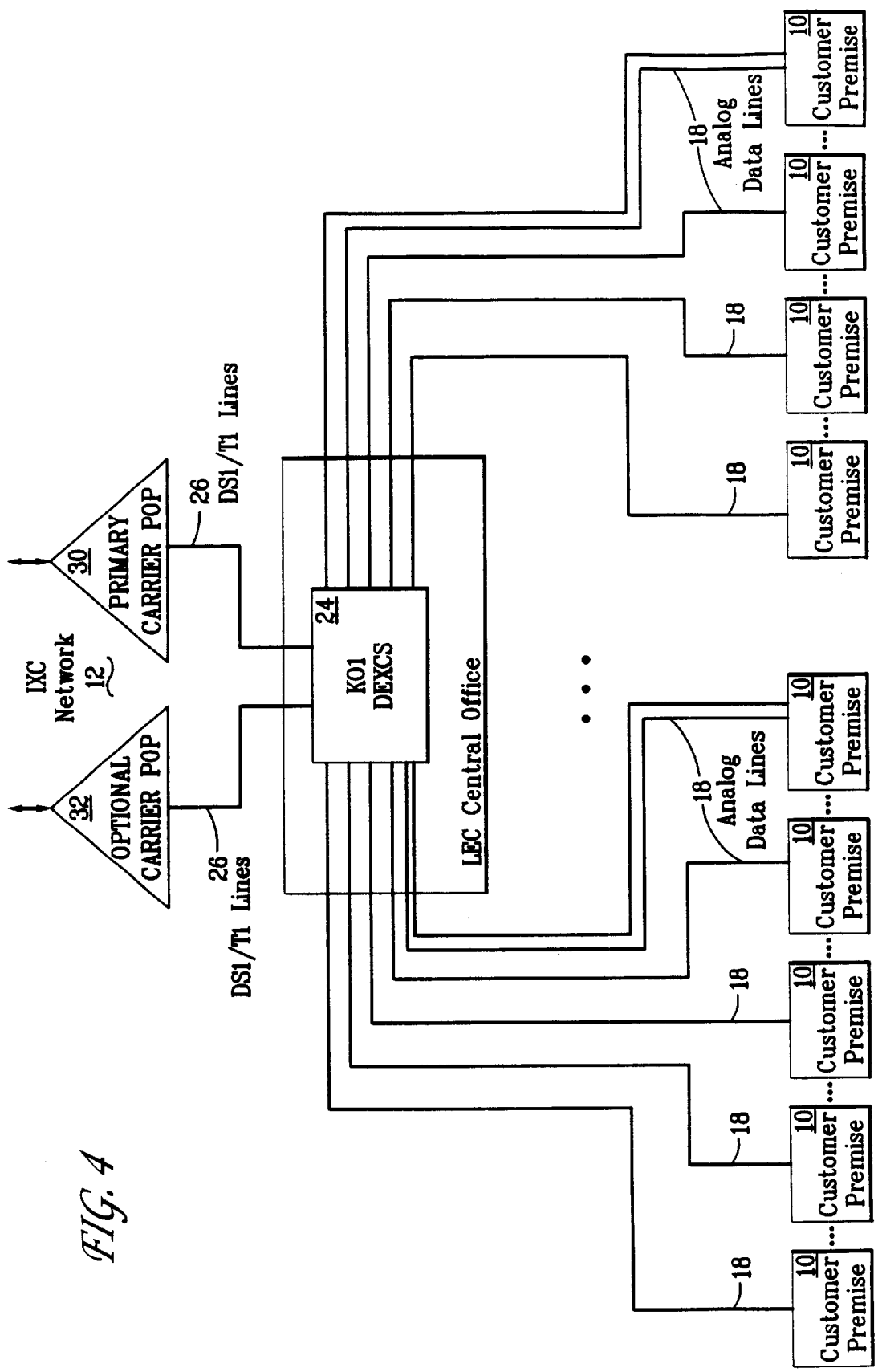
FIG. 4 illustrates the hardwire connection between the subscriber premises and the IXC network in accordance with an alternate embodiment of the invention in which the analog data lines are connected directly to the DEXCS frame.

Those skilled in the art will further appreciate that direct analog connections could be utilized to connect the customer premises equipment 10 directly to the DEXCS frame 24 at the LEC Central Office as illustrated in FIG. 4. Such a LEC bypass approach is available by virtue of the fact that the DEXCS frame 24 will accept analog interface cards which are a tariffed service provided by the LEC at the LEC Central Office. In the embodiment of FIG. 4, the DEXCS frame 24 can be programmed as FXS signaling at the tandem side of the office and FXO to the T1 carrier side. A cross-connect would then be established in a conventional manner in order to complete the circuit pathway. However, those skilled in the art will appreciate that the cost of such an analog connection and long haul analog lines would be prohibitively expensive and are not presently preferred. Since the key element in the marketability of the present invention is the ability to provide bundled transport to lower the bypass costs, the approach of FIG. 4 is not presently cost effective.

Although an exemplary embodiment of the invention has been described in detail above, those skilled in the art will readily appreciate that many additional modifications are possible in the exemplary embodiment without materially departing from the novel teachings and advantages of the invention. For example, another modulation scheme besides the foreign exchange modulation scheme utilized in the preferred embodiment may be implemented in accordance with the invention. Accordingly, these and all such modifications are intended to be included within the scope of this invention as defined in the following claims.

I claim:

1. A communications path for providing analog voice grade communications from a caller to an interexchange carrier ("IXC") communications link without requiring payment of an originating per call access fee to a local exchange carrier service provider ("LEC") for use of LEC switching equipment tariffed for voice services in the completion of a call from a caller's telephone equipment at a caller's premises to a called party via said LEC switching equipment, said communications path comprising:

an analog data line connected at one end to said caller's telephone equipment so as to receive analog voice signals;

a multiplexer connected to another end of said analog data line, said multiplexer containing a converter that converts an analog voice signal on said analog data line to a digital voice signal;

a first digital data line connected at one end to said multiplexer and configured to carry a plurality of channels of digital voice signals to/from said multiplexer;

a reconfigurable digital electronic cross-connect system ("DEXCS") tariffed for data services which is configured to provide signaling over each of said plurality of channels of said digital data line to/from said multiplexer without the use of customized customer premise signaling equipment by the caller and which provides switched connections to respective outputs of said DEXCS; and a second digital data line which connects said respective outputs of said DEXCS to said IXC communications link, wherein said multiplexer is located at a LEC central office and said converter comprises at least one Foreign Exchange Service ("FXS") module including an A/D converter that converts said analog voice signal on said analog data line to said digital voice signal and a D/A converter that converts a digital voice signal from said first digital data line to an analog voice signal for transmission to the caller's telephone equipment via said analog data line, and wherein said at least one FXS module modulates call routing data onto said digital voice signals using one of ground start and ear and mouth signaling at the bit level.

2. A communications path as in claim 1, wherein said analog data line is a four-wire leased line which is terminated on a four-wire jack at the caller's premises.

3. A communications path as in claim 1, wherein said first and second digital data lines comprise T1 lines which are D4/AMI configured for a plurality of 56 kbps DS0 channels.

4. A communications path as in claim 1, wherein said first digital data line comprises a T1 line connected to said multiplexer, a T3 multiplexer having one side connected to said T1 line, and a T3 line connected to another side of said T3 multiplexer.

5. A communications path as in claim 4, wherein said first digital data line further comprises at least one of a T3:T1 Digital Access Cross-Connect System (DACCS) and another T3 multiplexer connected between said T3 line and another T1 line connected to said reconfigurable DEXCS.

6. A communications path as in claim 1, wherein said DEXCS is configured to provide Foreign Exchange Office ("FXO") loop start signaling to/from said FXS module.

7. A communications path as in claim 1, wherein said DEXCS is configured to provide Foreign Exchange Service ("FXS") loop start signaling to/from said IXC communications link.

8. A communications path as in claim 1, further comprising a plurality of analog data lines connected at said one end thereof to telephone equipment at respective caller premises and at said another end thereof to said multiplexer.

9. A communications path for providing analog voice grade communications from a caller to an interexchange carrier ("IXC") communications link without requiring payment of an originating per call access fee to a local exchange carrier service provider ("LEC") for use of LEC switching equipment tariffed for voice services in the completion of a call from a caller's telephone equipment at a caller's premises to a called party via said LEC switching equipment, said communications path comprising:

an analog data line connected at one end to said caller's telephone equipment so as to receive analog voice signals;

a converter connected to another end of said analog data line that converts an analog voice signal on said analog data line to a digital voice signal;

a first digital data line connected at one end to said converter and configured to carry a plurality of channels of digital voice signals to/from said converter;

a reconfigurable digital switch tariffed for data services that is configured to provide signaling over each of said plurality of channels of said digital data line to/from said converter without the use of customized customer premise signaling equipment by the caller and that provides switched connections to respective outputs of said digital switch; and a second digital data line which connects said respective outputs of said digital switch to said IXC communications link, wherein said converter is located at a LEC central office and comprises a multiplexer having at least one Foreign Exchange Service ("FXS") module including an A/D converter that converts said analog voice signal on said analog data line to said digital voice signal and a D/A converter that converts a digital voice signal from said first digital data line to an analog voice signal for transmission to the caller's telephone equipment via said analog data line, and wherein said at least one FXS module modulates call routing data onto said digital voice signals using one of ground start and ear and mouth signaling at the bit level.

10. A communications path as in claim 9, wherein said analog data line is a four-wire leased line which is terminated on a four-wire jack at the caller's premises.

11. A communications path as in claim 9, wherein said first and second digital data lines are T1 lines which are D4/AMI configured for a plurality of 56 kbps DS0 channels.

12. A communications path as in claim 9, wherein said first digital data line comprises a T1 line connected to said converter, a T3 multiplexer having one side connected to said T1 line, and a T3 line connected to another side of said T3 multiplexer.

13. A communications path as in claim 12, wherein said first digital data line further comprises at least one of a T3:T1 Digital Access Cross-Connect System (DACCS) and another T3 multiplexer connected between said T3 line and another T1 line connected to said reconfigurable digital switch.

14. A communications path as in claim 9, wherein said digital switching means is configured to provide Foreign Exchange Office ("FXO") loop start signaling to/from said FXS module.

15. A communications path as in claim 9, wherein said digital switching means is configured to provide Foreign Exchange Service ("FXS") loop start signaling to/from said IXC communications link.

16. A communications path as in claim 9, further comprising a plurality of analog data lines connected at said one end thereof to telephone equipment at respective caller premises and at said another end thereof to said converter.

17. A method of providing analog voice grade communications from a caller to an interexchange carrier ("IXC") communications link without requiring payment of an originating per call access fee to a local exchange carrier service provider ("LEC") for use of LEC switching equipment tariffed for voice services in the completion of a call from a caller's telephone equipment at a caller's premises to a called party via said LEC switching equipment, said method comprising the steps of:

connecting one end of an analog data line to said caller's telephone equipment so as to receive analog voice signals;

providing access to a converter at a LEC central office that converts an analog voice signal on said analog data line to a digital voice signal;

configuring a first digital data line connected at one end to said converter so as to carry a plurality of channels of digital voice signals to/from said converter;

configuring a digital switch tariffed for data services so as to provide signaling over each of said plurality of channels of said digital data line to/from said converter without the use of customized customer premise signaling equipment by the caller and so as to provide switched connections to respective outputs of said digital switch;

configuring a multiplexer at said LEC central office so as to include at least one Foreign Exchange Service ("FXS") module including an A/D converter that converts said analog voice signal on said analog data line to said digital voice signal and a D/A converter that converts a digital voice signal from said first digital data line to an analog voice signal for transmission to the caller's telephone equipment via said analog data line;

modulating call routing data onto said digital voice signal at said FXS module using one of ground start and ear and mouth signaling at the bit level; and configuring a second digital data line connected at one end to said respective outputs of said digital switch so as to carry switched digital voice signals to/from said IXC communications link.

18. A method as in claim 17, wherein said analog data line is a four-wire leased line and said connecting step comprises the step of terminating said four-wire leased line on a four-wire jack at the caller's premises.

19. A method as in claim 17, wherein said steps of configuring said first and second digital data lines each comprise the step of D4/AMI configuring T1 lines for a plurality of 56 kbps DS0 channels.

20. A method as in claim 17, wherein said step of configuring said first digital data line comprises the steps of multiplexing a T1 line connected to said converter to a T3 line and demultiplexing said T3 line to another T1 line connected to said digital switch.

21. A method as in claim 17, wherein said digital switching means configuring step comprises the step of providing Foreign Exchange Office ("FXO") loop start signaling to/from said FXS module.

22. A method as in claim 17, wherein said digital switching means configuring step comprises the step of providing Foreign Exchange Service ("FXS") loop start signaling to/from said IXC communications link.

23. A method as in claim 17, comprising the additional steps of connecting one end of a plurality of analog data lines to telephone equipment at respective caller premises and another end thereof to said converter.

24. A method of providing voice communications from a caller to a called party via an interexchange carrier ("IXC") communications link without requiring payment of an originating per call access fee to a local exchange carrier service provider ("LEC") for use of LEC switching equipment tariffed for voice services, said method comprising the steps of:

converting analog voice data from the caller's telephone equipment into digital voice data signals and modulating call routing data onto said digital voice data signals using a converter at a LEC central office and using one of ground start and ear and mouth signaling at the bit level;

transmitting said modulated digital voice data signals via a digital voice channel of a first digital data line connected at one end to said converter;

routing said modulated digital voice data signals to a particular output terminal of a digital switch tariffed for data services at said LEC central office;

transmitting said modulated digital voice data signals from said output terminal to said IXC communications link via a digital voice channel of a second digital data line connected between said particular output terminal of said digital switch and said IXC communications link;

routing said modulated digital voice data signals through said IXC communications link to a LEC central office of said called party; and converting said digital voice data to analog voice data at said LEC central office of said called party for receipt by telephone equipment of said called party.

25. A method as in claim 24, comprising the step of transmitting said analog voice data from the caller's telephone equipment to said converter via a four-wire leased line terminated on a four-wire jack at the caller's premises.

26. A method as in claim 24, wherein said transmitting steps each comprise the step of transmitting said digital voice data signals via one of a plurality of 56 kbps DS0 channels of a T1 line.

27. A method as in claim 24, wherein said step of transmitting said modulated digital voice data signals via a digital voice channel of a first digital data line comprises the steps of multiplexing a T1 line connected to said converter to a T3 line and demultiplexing said T3 line to another T1 line connected to said digital switch.

28. A method as in claim 24, comprising the additional steps of converting a digital voice signal from said called party received via first digital data line to an analog voice signal from said called party using said converter at said LEC central office and transmitting the analog voice signal from the called party to the caller's telephone equipment.

29. A method of providing analog voice grade communications from a caller to an interexchange carrier ("IXC") communications link without requiring payment of an originating per call access fee to a local exchange carrier service provider ("LEC") for use of LEC switching equipment tariffed for voice services in the completion of a call from a caller's telephone equipment at a caller's premises to a called party via said LEC switching equipment, said method comprising the steps of:

connecting one end of an analog data line to said caller's telephone equipment so as to receive analog voice signals;

connecting another end of said analog data line to a converter at a LEC central office that converts an analog voice signal on said analog data line to a digital voice signal using one of ground start and ear and mouth signaling at the bit level;

configuring a digital switch tariffed for data services so as to provide signaling over said analog data line via said converter without the use of customized customer premise signaling equipment by the caller and so as to provide switched connections to respective outputs of said digital switch; and configuring a digital data line connected at one end to said respective outputs of said digital switch so as to carry switched digital voice signals to/from said IXC communications link.

30. A method of providing voice communications from a caller to a called party via an interexchange carrier ("IXC") communications link without requiring payment of an originating per call access fee to a local exchange carrier service provider ("LEC") for use of LEC switching equipment tariffed for voice services, said method comprising the steps of:

converting analog voice data from the caller's telephone equipment into digital voice data signals and modulating call routing data onto said digital voice data signals using a converter at a LEC central office and using one of ground start and ear and mouth signaling at the bit level;

routing said modulated digital voice data signals to a particular output terminal of a digital switch tariffed for data services at said LEC central office;

transmitting said modulated digital voice data signals from said output terminal to said IXC communications link via a digital voice channel of a digital data line connected between said particular output terminal of said digital switch and said IXC communications link;

routing said modulated digital voice data signals through said IXC communications link to a LEC central office of said called party; and converting said digital voice data to analog voice data at said LEC central office of said called party for receipt by telephone equipment of said called party.

* * * * *